United States Patent
Butler et al.

(10) Patent No.: US 12,422,158 B2
(45) Date of Patent: Sep. 23, 2025

(54) ENERGY MANAGEMENT AND SMART THERMOSTAT LEARNING METHODS AND CONTROL SYSTEMS

(71) Applicant: Copeland Comfort Control LP, St. Louis, MO (US)

(72) Inventors: Brian Richard Butler, Centerville, OH (US); Kevin Patrick Hallinan, Dayton, OH (US); Kefan Huang, Miamisburg, OH (US); Abdulrahman Alanezi, Al-Jubail (SA); David Alexander Alfano, Lancaster, PA (US); Andrew M. Welch, Franklin, OH (US); Stuart Keith Morgan, West Chester, OH (US)

(73) Assignee: Copeland Comfort Control LP, St. Louis, MO (US)

( * ) Notice: Subject to any disclaimer, the term of this patent is extended or adjusted under 35 U.S.C. 154(b) by 275 days.

(21) Appl. No.: 17/823,150

(22) Filed: Aug. 30, 2022

(65) Prior Publication Data
US 2023/0063986 A1    Mar. 2, 2023

Related U.S. Application Data

(60) Provisional application No. 63/260,719, filed on Aug. 30, 2021.

(51) Int. Cl.
*G05B 13/02*     (2006.01)
*F24F 11/30*     (2018.01)
(Continued)

(52) U.S. Cl.
CPC .............. *F24F 11/63* (2018.01); *F24F 11/30* (2018.01); *G05B 13/027* (2013.01); *F24F 2130/10* (2018.01)

(58) Field of Classification Search
CPC ........ F24F 11/63; F24F 11/30; F24F 2130/10; F24F 11/46; F24F 2110/10; G05B 13/027; G05B 2219/2614; G05B 15/02
See application file for complete search history.

(56) References Cited

U.S. PATENT DOCUMENTS 8,239,168 B2    8/2012  House et al.
8,583,531 B2   11/2013  Hirl
(Continued)

FOREIGN PATENT DOCUMENTS

EP          3224547 A1    10/2017
WO       2016182434 A1    11/2016

OTHER PUBLICATIONS

Huang, Kefan et al., Self-Learning Algorithm to Predict Indoor Temperature and Cooling Demand from Smart WiFi Thermostat in a Residential Building, Sustainability, 2020, vol. 12, No. 7110; pp. 1-14.
(Continued)

*Primary Examiner* — Santosh R Poudel
(74) *Attorney, Agent, or Firm* — Armstrong Teasdale LLP

(57) ABSTRACT

A method of HVAC system performance monitoring using a computing device connected to at least one thermostat of an HVAC system in a building includes receiving thermostat data from the thermostat, the thermostat data including temperature setpoint data, measured building temperature data, and HVAC operation data for a time period. Weather data is received from a weather service for the time period, and the thermostat data is synchronized with the weather data with respect to time. At least one machine learning model is trained using the synchronized thermostat and weather data, and performance of the HVAC system over time is monitored using the trained machine learning model.

17 Claims, 22 Drawing Sheets

(51) Int. Cl.
*F24F 11/63* (2018.01)
*F24F 130/10* (2018.01)

(56) References Cited

U.S. PATENT DOCUMENTS

| | | | |
|---|---|---|---|
| 8,660,813 | B2 | 2/2014 | Curtis et al. |
| 9,190,844 | B2 | 11/2015 | Tran |
| 9,429,961 | B2 | 8/2016 | Sprinkle et al. |
| 9,600,011 | B2 | 3/2017 | Weaver et al. |
| 9,625,889 | B2 | 4/2017 | Gupta et al. |
| 9,651,929 | B2 | 5/2017 | Horesh et al. |
| 9,817,409 | B2 | 11/2017 | Murthy |
| 9,880,577 | B2 | 1/2018 | Dyess et al. |
| 9,890,970 | B2 | 2/2018 | Bruck et al. |
| 10,101,050 | B2 | 10/2018 | Radovanovic et al. |
| 10,114,721 | B2 | 10/2018 | Roth et al. |
| 10,146,237 | B2 | 12/2018 | Turney et al. |
| 10,216,158 | B2 | 2/2019 | Wacker |
| 10,241,528 | B1 | 3/2019 | Frader-Thompson et al. |
| 10,295,974 | B2 | 5/2019 | Bruck et al. |
| 10,354,345 | B2 | 7/2019 | Sloop et al. |
| 10,451,302 | B2 | 10/2019 | Lewis |
| 10,571,876 | B2 | 2/2020 | Buda et al. |
| 10,584,890 | B2 | 3/2020 | Steinberg |
| 10,746,425 | B1 | 8/2020 | Frader-Thompson et al. |
| 10,783,285 | B2 | 9/2020 | Parthasarathy et al. |
| 10,832,266 | B2 | 11/2020 | Ruffner et al. |
| 10,845,079 | B1* | 11/2020 | Picardi .................. F24F 11/64 |
| 10,867,084 | B2 | 12/2020 | Hauenstein |
| 10,900,684 | B2 | 1/2021 | Bentz et al. |
| 10,935,271 | B2 | 3/2021 | Reeve et al. |
| 10,948,209 | B2 | 3/2021 | Song et al. |
| 2003/0171851 | A1 | 9/2003 | Brickfield et al. |
| 2007/0203860 | A1 | 8/2007 | Golden et al. |
| 2011/0231320 | A1 | 9/2011 | Irving |
| 2012/0065783 | A1* | 3/2012 | Fadell .................. F24F 11/30 703/7 |
| 2012/0068854 | A1 | 3/2012 | Shiflet et al. |
| 2012/0203536 | A1* | 8/2012 | Gangemi ............ G06F 11/3447 703/22 |
| 2012/0221150 | A1* | 8/2012 | Arensmeier ....... G05B 23/0221 702/183 |
| 2013/0154839 | A1* | 6/2013 | Barton .................. F24F 12/001 340/584 |
| 2014/0278203 | A1* | 9/2014 | Lange .................... G01K 17/20 702/136 |
| 2016/0018835 | A1 | 1/2016 | Gaasch et al. |
| 2016/0266594 | A1 | 9/2016 | Kauffman et al. |
| 2016/0314440 | A1 | 10/2016 | Charpentier et al. |
| 2018/0324030 | A1* | 11/2018 | Dang .................... H04L 41/142 |
| 2019/0041081 | A1* | 2/2019 | Zeifman .................. F24F 11/63 |
| 2019/0086108 | A1 | 3/2019 | Okita et al. |
| 2019/0178518 | A1 | 6/2019 | Zimmerman et al. |
| 2019/0195525 | A1* | 6/2019 | Varghese ................. G06N 5/04 |
| 2019/0203965 | A1 | 7/2019 | Thibault |
| 2019/0310667 | A1 | 10/2019 | Brown et al. |
| 2019/0347670 | A1 | 11/2019 | Abramson et al. |
| 2020/0041967 | A1* | 2/2020 | Shrivastava ........... G02F 1/163 |
| 2020/0217545 | A1 | 7/2020 | Favaloro et al. |
| 2020/0300491 | A1 | 9/2020 | Matsuoka et al. |
| 2021/0094582 | A1* | 4/2021 | Lee ...................... G11B 27/031 |
| 2021/0254851 | A1* | 8/2021 | Taguchi ............. G05B 13/0265 |
| 2022/0192522 | A1* | 6/2022 | Leabman ........... A61B 5/14532 |
| 2023/0009603 | A1* | 1/2023 | Cola .................. G05D 23/1919 |

OTHER PUBLICATIONS

Alanezi, Abdulrahman et al., Automated Residential Energy Audits Using a Smart WiFi Thermostat-Enabled Data Mining Approach, Energies, 2021, vol. 14, No. 2500, pp. 1-23.

Huang, Kefan et al., Data Mining of Smart WiFi Thermostats to Develop Multiple Zonal Dynamic Energy and Comfort Models of a Residential Building, Purdue University, Purdue e-Pubs, Jul. 2018, Paper 257, pp. 3175-1-3175-10.

Huang, Kefan, Data Mining for Residential Buildings Using Smart WiFi, May 2021, pp. 1-67.

White, Saill et al., Predicting Heating and Cooling Energy Use in New California Houses, Energy Solutions Unlimited, pp. 8.221-8.229.

Tarhuni, Badr Ibrahim Al, Predicting Residential Heating Energy Consumption and Savings Using Neural Network Approach, May 2019, pp. 1-73.

Alanezi, Abdulrahman et al., Using Smart-WiFi Thermostat Data to Improve Prediction of Residential Energy Consumption and Estimation of Savings, Energies, 2021, vol. 14, No. 187, pp. 1-16.

* cited by examiner

Fig. 6

| Meter Period | Metered Energy Data | | Thermostat Data | | | Weather Data | |
|---|---|---|---|---|---|---|---|
| | E.Electric (kWh) | E.gas (ccf) | % Time Cool Setpoint in Temp Range | | | % Time Outdoor Temperature in Range | |
| | | | 66-68 | 78-80 | 80-82 | 66-68 | 90-92 |
| 1 | 1120 | 140 | 25.4 | 10 | 0 | 5 | 5 |
| ... | ... | ... | ... | ... | ... | ... | ... |
| 12 | 840 | 72 | 0 | 25 | 0 | 0 | 0 |

Fig. 10

| Metered Energy Data | | | | |
|---|---|---|---|---|
| E.Electric | | | E.gas | |
| Actual (kWh) | Weather Independent (kWh) | Cooling (kWh) | Actual (ccf) | Weather Independent (ccf) | Heating (ccf) |
| 1120 | 550 | 570 | 140 | 12 | 128 |
| ... | | | ... | | |
| 840 | 570 | 270 | 72 | 21 | 51 |
| LIGHTING & APPLIANCES | | COOLING | WATER HEATING | | HEATING |

Fig. 14

Inputs for new houses energy characteristics are not known

| House | Mnth | E.ele | T.Set Data | T.Out Data | Oc c | A.Wall | Freq.1 | ... | Freq.N |
|---|---|---|---|---|---|---|---|---|---|
| 1 | 1 | 1100 | T.set.1 | T.Out1 | 4 | 1100 | 41 | ... | 0.07 |
| 1 | ... |  | T.set.2 |  |  | 1100 | 41 | ... | 0.07 |
| 1 | 12 | 700 | T.set.2 | T.Out12 | 4 | 1100 | 41 | ... | 0.07 |
| 2 | 1 | 450 | T.set.1 | T.Out1 | 5 | 1500 | 25 | ... | 0.17 |
| 2 | ... |  | T.set.2 |  | 5 | 1500 | 25 | ... | 0.17 |
| 2 | 12 | 475 | T.set.2 | T.Out12 | 5 | 1500 | 25 | ... | 0.17 |

Machine Learning Models for Energy Characteristics Developed in Fig. 18

Predict →

Targets – Energy characteristics

| House | R.Wall | R.Attic | R.Windw | SEER |
|---|---|---|---|---|
| 1 | 12 | 4 | 1 | 12 |
| 2 | 5 | 36 | 2.5 | 12 |
| ... | ... | ... | ... | ... |
| N | 18 | 63 | 5 | 18 |

Fig. 19

Electric.Savings.Annual

| House | Tset = 76 | Tset = 78 | Tset = 80 | R.Wall = 12 | R.Wall = 16 | R.Att = 32 | R.Att = 48 | R.Att = 62 | SEER = 14 | SEER = 18 | SEER = 20 |
|---|---|---|---|---|---|---|---|---|---|---|---|
| 1 | S11 | S12 | S13 | S14 | S15 | S16 | S16 | S17 | S18 | ... | S19 |
| 2 | ... | ... | ... | ... | ... | ... | ... | ... | ... | ... | ... |
| 3 | S31 | S32 | S33 | S34 | S35 | S36 | S36 | S37 | S18 | ... | S39 |
| 3 | ... | ... | ... | ... | ... | ... | ... | ... | ... | ... | ... |

Fig. 20

ENERGY MANAGEMENT AND SMART THERMOSTAT LEARNING METHODS AND CONTROL SYSTEMS

CROSS-REFERENCE TO RELATED APPLICATION

This application claim priority to U.S. Provisional Patent Application No. 63/260,719 filed Aug. 30, 2021, the entire disclosure of which is hereby incorporated by reference in its entirety.

FIELD

The field of the disclosure relates generally to thermostats, and more particularly, to systems and methods for learning and predicting from smart thermostat data, and controlling a thermostat based on such learning and predicting.

BACKGROUND

Thermostats are commonly used to control operation of heating ventilation and air conditioning (HVAC) systems and refrigeration systems to achieve desired temperatures in conditioned spaces. In recent years, smart thermostats have begun to replace conventional thermostats. These smart thermostats frequently include network communication capabilities, such as a Wi-Fi communication module allowing connection to the Internet over a Wi-Fi network, and suitable programming to allow a user to retrieve data from the smart thermostat (such as current temperature in the conditioned space and current temperature setpoints) and change settings of the smart thermostat from a remote location via the Internet. At least some smart thermostats include simple learning capabilities to allow the smart thermostat to learn from the user's changes to the thermostat settings and attempt to anticipate the user's needs. For example, some smart thermostats are capable of learning the times and amount by which a user changes the temperature setpoint and will attempt to change the setpoints appropriately in the future without user interaction. Known smart thermostats and systems do not generally make use of additional information, do not predict future needs based on data other than the user's interaction with the smart thermostat, and do not integrate data from multiple smart thermostats.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of this disclosure is a method of HVAC system performance monitoring using a computing device connected to at least one thermostat of an HVAC system in a building. The method includes receiving thermostat data from the thermostat, the thermostat data including temperature setpoint data, measured building temperature data, and HVAC operation data for a time period. Weather data is received from a weather service for the time period, and the thermostat data is synchronized with the weather data with respect to time. At least one machine learning model is trained using the synchronized thermostat and weather data, and performance of the HVAC system over time is monitored using the trained machine learning model.

Another aspect is a performance monitoring system including a communication interface, a memory, and a processor coupled to the communication interface and the memory. The communication interface is operable to communicatively couple the performance monitoring system to at least one thermostat of an HVAC system in a building. The memory stores instructions that when executed by the processor cause the processor to receive thermostat data from the thermostat through the communication interface, the thermostat data including temperature setpoint data, measured building temperature data, and HVAC operation data for a time period; receive weather data from a weather service for the time period; synchronize the thermostat data with the weather data with respect to time; train at least one machine learning model using the synchronized thermostat and weather data; and monitor performance of the HVAC system over time using the trained machine learning model.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 6 is a diagram of the creation of uniformly spaced data from the smart thermostat data and outdoor weather data from FIG. 5.

FIG. 10 is a graphical presentation of an example set of data from a smart thermostat synchronized with collected weather data and residential energy consumption data.

FIG. 14 is a graph of an example result of the disaggregation shown in FIG. 13.

FIG. 19 is a representation of the use of the trained machine learning models of FIG. 18 to estimate the energy characteristics in new houses where energy characteristics aren't known.

FIG. 20 is an example output of a calculation for electrical savings from the thermostat management system.

Like reference symbols in the various drawings indicate like elements.

DETAILED DESCRIPTION

The embodiments described herein relate generally to energy management and thermostats. More particularly, embodiments relate to systems and methods for learning and predicting from smart thermostat data, and controlling a thermostat based on such learning and predicting.

Figure 1:
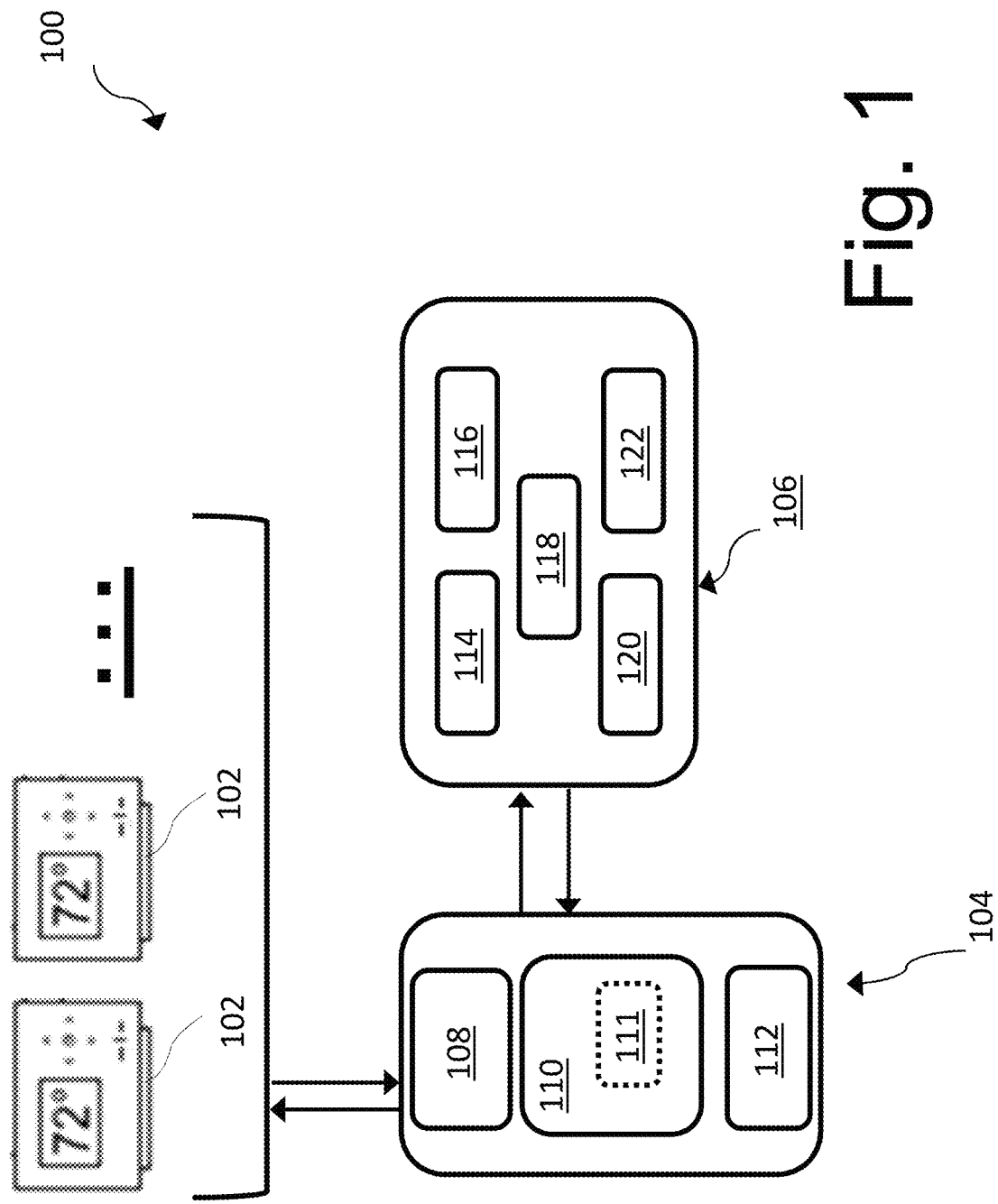
FIG. 1 is an illustration of an example thermostat control system.

An example of a thermostat control system of this disclosure (sometimes also referred to herein as an energy management system) is indicated generally in FIG. 1 by reference number 100. In this example, the thermostat control system 100 includes a server 104 in communication with a plurality of smart thermostats 102 and with a computing device 106. Server 104 includes a processor 108, a memory device 110, and a communication interface 112. Server 104 may include, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. Memory device 110 contains information 111 regarding user accounts and the plurality of smart thermostats 102 associated with each account.

Computing device 106 includes a processor 114, a memory device 116, a communication interface 118, a user interface 120, and a display device 122. Memory device 110 of server 104 stores instructions that when executed by the processor 108 cause the processor 108 to display visual representations of the plurality of smart thermostats 102, as well as groups and operating schedules and other views according to embodiments described herein, on the display device 122 of the computing device 106. Computing device 106 may include any computing device configured to function as described herein, including a smartphone, a tablet, a phablet, a laptop computer, a desktop computer, a dedicated computing device associated solely with the control system 100, and/or any other computing device. The computing device 106 and the server 104 may be collocated or may be located remote from each other. The computing device 106 may be a physical computing device, a virtual computing device, or a combination of a physical and a virtual computing device.

The methods described herein may be encoded as executable instructions embodied in a computer-readable medium including, without limitation, a storage device and/or a memory device. Such instructions, when executed by a processor, cause the processor to perform at least a portion of the methods described herein. The memory device can include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage.

Figure 2:
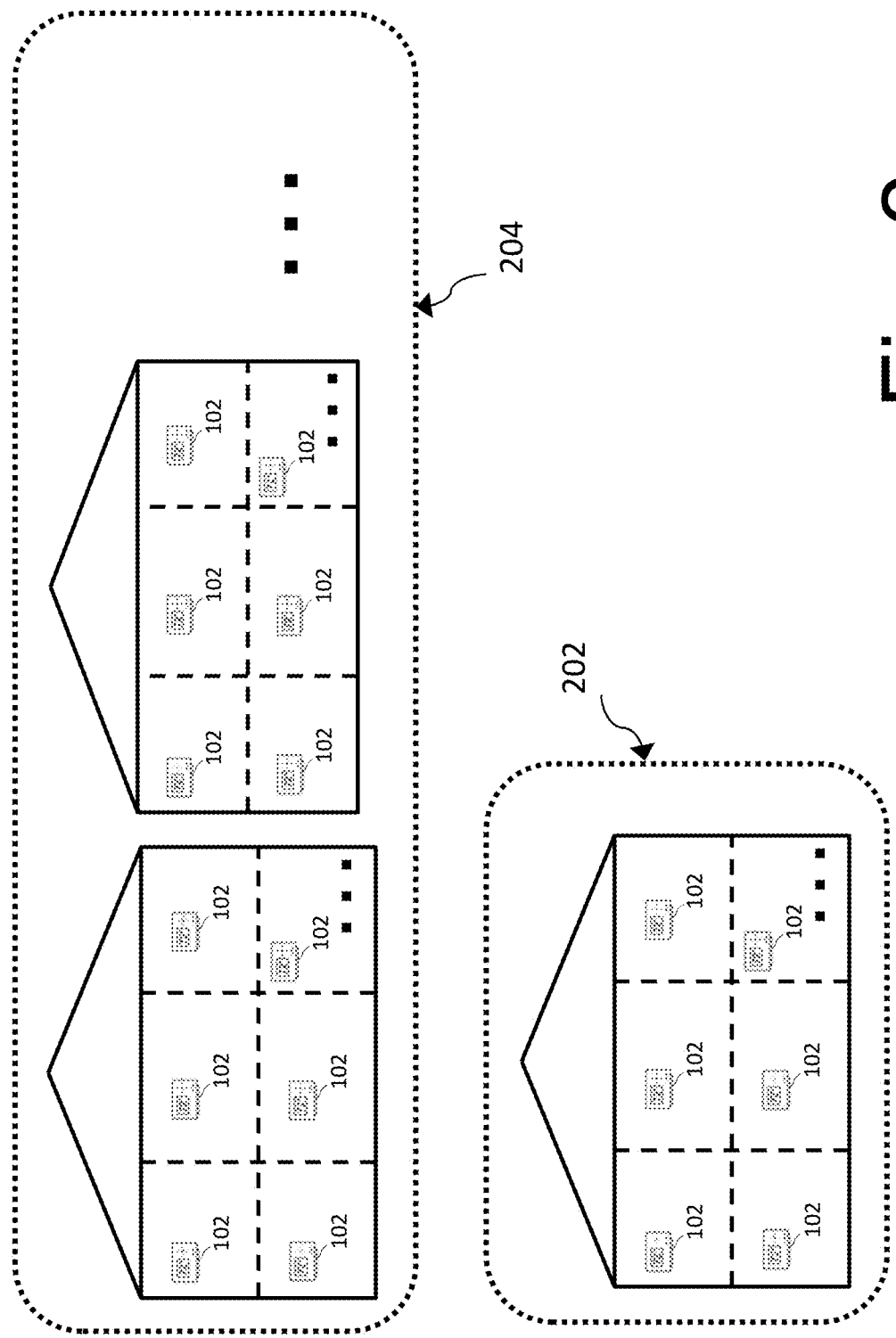
FIG. 2 is a block diagram of a portion of a control system for use in the thermostat control system shown in FIG. 1.

FIG. 2 is a block diagram of a portion of a control system for use in the thermostat control system 100 shown in FIG. 1. The plurality of smart thermostats 102 associated with an account may be housed in a single building 202 or may be distributed over several buildings 204. The buildings 202 and 204 may be any type of building including an HVAC system, including residences, commercial buildings, public buildings, and the like. For simplicity, the buildings may sometimes be referred to herein as residences, without limiting the applicability to a residence. In cases where the plurality of smart thermostats 102 is distributed over several buildings, some buildings may be in close proximity to one another, such as several buildings located on a college campus. Additionally or alternatively, buildings housing the plurality of smart thermostats 102 may be remotely located from one another, such as located in different neighborhoods of the same city, in different cities, in different states, in different countries, or the like. For example, the plurality of smart thermostats 102 associated with an account may be associated with a school, university, daycare, church, place of worship, non-profit organization, property management company, restaurant, coffee shop, bars, bank, credit union, or the like, that may have a building with several thermostats, several buildings, and/or several locations.

Figure 3:
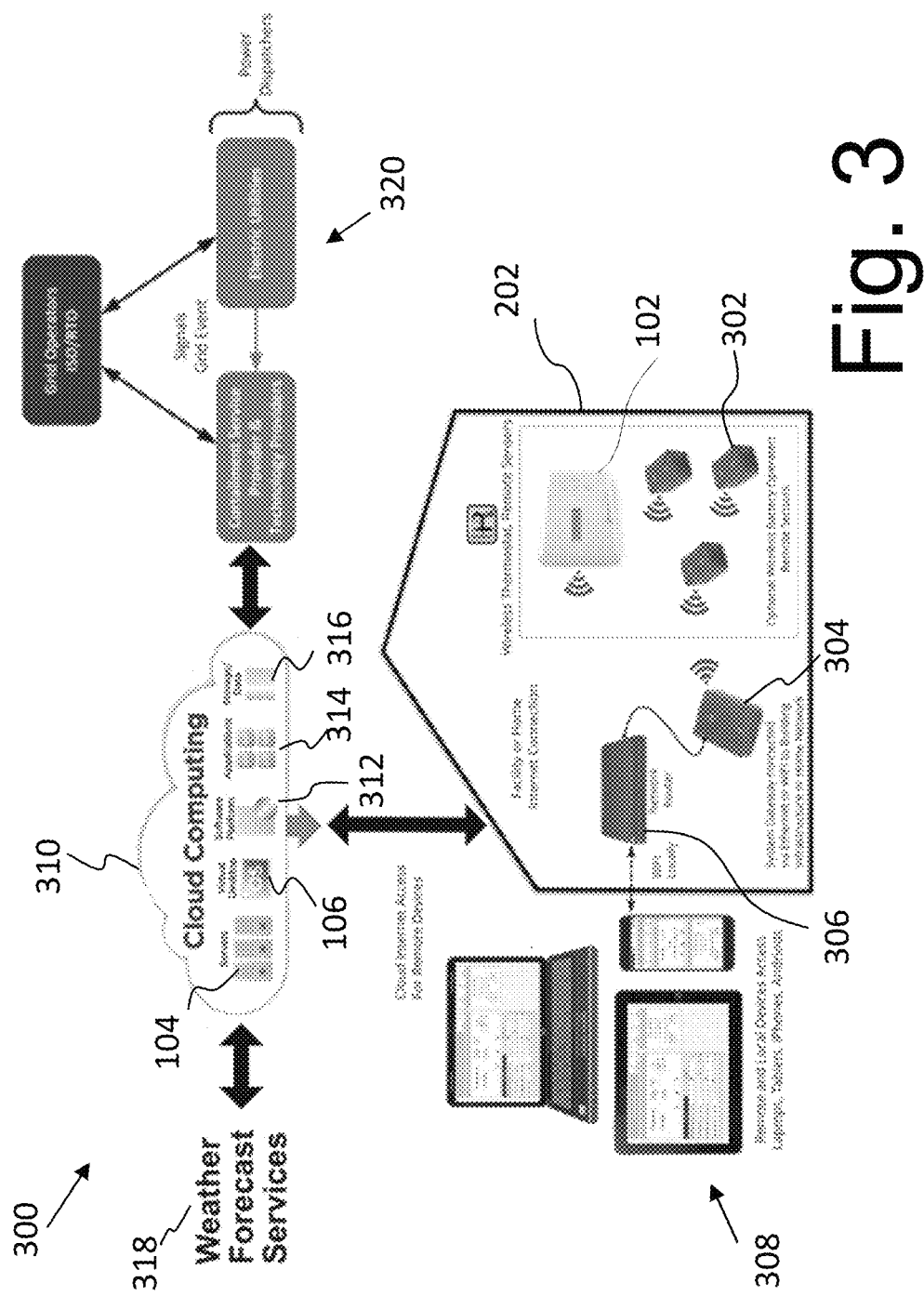
FIG. 3 is another example of a thermostat control system.

FIG. 3 is another example of a thermostat control system 300 of this disclosure. The thermostat control system 300 is similar to the thermostat control system 100, and common components are indicated by common reference numbers. As used herein, references to a thermostat control system or an energy management system refer to the thermostat control system 100 and the thermostat control system 300, unless otherwise specified. For clarity of illustration, a single building 202 and a single smart thermostat 102 are shown in FIG. 3, but the system 300 may include a plurality of smart thermostats 102 in a single building 202 or distributed over several buildings 204.

The thermostat control system 300 includes remote sensors 302, a local system gateway 304, and, a network router 306. The remote sensors 302 may be temperature sensors, humidity sensors, pressure sensors, light sensors, wind sensors, or any other suitable sensors for monitoring environmental conditions in or around the building 202 and/or building conditions, such as electricity usage. In the example, the remote sensors are wireless sensors using any suitable wireless communication protocol. In other embodiments, the remote sensors 302 are wired sensors. Some embodiments do not include the remote sensors 302. The smart thermostat 102 and the remote sensors 302 communicate with the local system gateway 304 using wireless communication. Alternatively, the smart thermostat 102 and the remote sensors 302 communicate with the local system gateway 304 using wired communication. The local system gateway 304 is communicatively coupled to the network router 306 by a wired or wireless connection. Thus, remote access devices 308 (such as a computer, a tablet, or a mobile phone) may communicate with the smart thermostat 202 and remote sensors 302 (such as to receive current sensed conditions, setpoints or to change settings on the smart thermostat 202) through the local system gateway 304 via the network router 306. In other embodiments, local system gateway 304 is integrated with the network router 306 or is omitted. In embodiments without the local system gateway, the smart thermostat 102 and the remote sensors 302 are communicatively coupled to the network router 306 without an intermediary, such as via WiFi communication.

In the thermostat control system 300, the server 104 and the computing device 106 are part of a cloud computing system 310 communicatively coupled, via a network such as the Internet, to the smart thermostat 102 and remote sensors 302 through the network router 306 and the local system gateway 304. The cloud computing system 310 also includes a software platform 312, applications 314, and data storage 316. As will be described in further detail below, the cloud computing system receives, or actively retrieves, data from the smart thermostat 102 and the remote sensors 302. The cloud computing system 310 also receives weather data (e.g., current conditions and/or forecast conditions) from a weather service 318. Further, the cloud computing system 310 is communicatively coupled to one or more power entities 320. The power entities 320 provide electrical power to the building 202, operate an electrical power grid, handle curtailment and demand response, and the like. The cloud computing system collects the real time data from all smart thermostats and remote sensors within the building, synched with current and forecast weather conditions synched to the data, and the grid manager.

Figure 4:
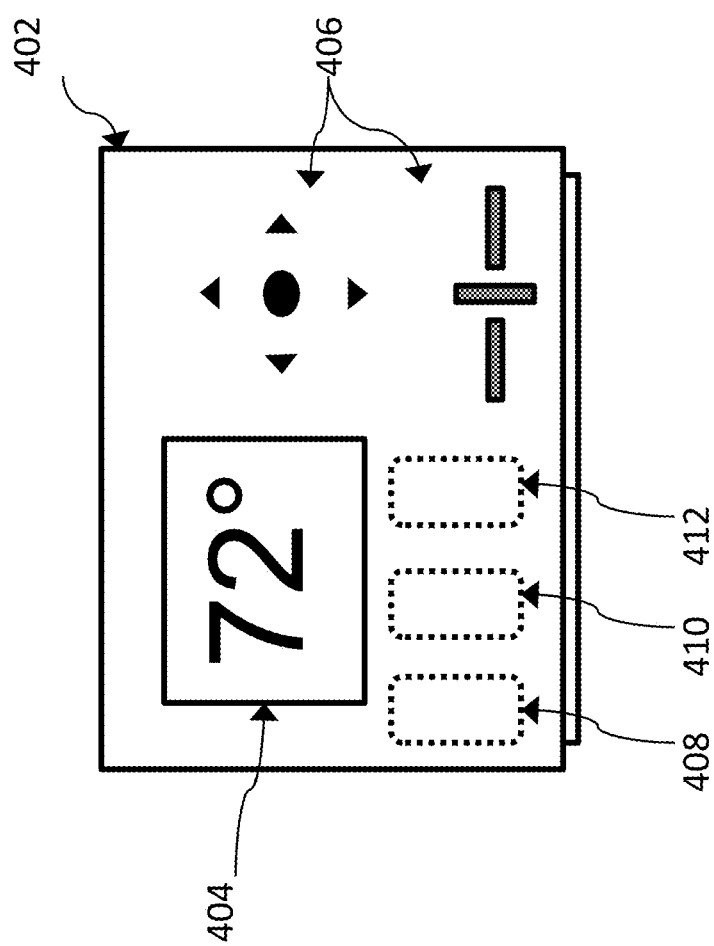
FIG. 4 is a block diagram of a thermostat for use in the systems shown in FIG. 1 and FIG. 3.

FIG. 4 is a block diagram of a smart thermostat 102 for use in the control system 100 shown in FIG. 1 and the system 300 shown in FIG. 3. The smart thermostat 102 may include and/or be embodied in a computing device. Smart thermostat 102 includes a display device 404, a user interface 406, a processor 408, a memory device 410, and a communication interface 312. Each smart thermostat 102 is capable of sensing temperature at its location and communicating the temperature to the server 104. In some embodiments, one or more additional elements of thermostat data, such as humidity, temperature at a second location, operating status, fan speed, and the like, is transmitted by the smart thermostats 102 to the server 104. Smart thermostat 102 is also capable of storing a heating operating schedule and a cooling operating schedule. In some embodiments, operating schedules are transmitted from server 104 to each smart thermostat 102. Smart thermostat 102 is further capable of responsively initiating operation of a heating or cooling operating schedule when a sensed temperature is more than a predetermined amount above or below a set point temperature, as designated in the schedule.

Server 104, smart thermostats 102, and computing device 106 may include one or more communication interfaces (112, 412, and 118 respectively) allowing them to communicate with each other as well as remote devices and systems, such as remote sensors 302, valve control systems, safety systems, remote computing devices, and the like. The communication interfaces may be wired or wireless communications interfaces that permit the computing device to communicate with the remote devices and systems directly or via a network. Wireless communication interfaces may include a radio frequency (RF) transceiver, a Bluetooth® adapter, a Wi-Fi transceiver, a ZigBee® transceiver, a near field communication (NFC) transceiver, an infrared (IR) transceiver, and/or any other device and communication protocol for wireless communication. (Bluetooth is a registered trademark of Bluetooth Special Interest Group of Kirkland, Washington; ZigBee is a registered trademark of the ZigBee Alliance of San Ramon, California.) Wired communication interfaces may use any suitable wired communication protocol for direct communication including, without limitation, USB, RS232, I2C, SPI, analog, and proprietary I/O protocols. Moreover, in some embodiments, the wired communication interfaces include a wired network adapter allowing the computing device to be coupled to a network, such as the Internet, a local area network (LAN), a wide area network (WAN), a mesh network, and/or any other network to communicate with remote devices and systems via the network.

Generally, the thermostat management system functions as follows. WiFi data, to include current residential space temperature and humidity, setpoint schedule, cooling and heating system status, and cooling and heating system power level, is communicated to the cloud computing system 310 (sometimes referred to as the cloud-based thermostat manager). This data is collected and synched with weather data (both current and forecast local weather associated with the zip code of the residence). The archived data is used by the cloud computing system 310 to create dynamic models for predicting, among other things: space temperature, humidity, cooling power status (typically a number between 0 and 100 depending upon if the system has multiple stages), and heating power status (again typically between 0 and 100 depending upon if the system has multiple stages). The inputs to the models can include: current and prior weather conditions (temperature, relative humidity, wind speed, cloud status); current and prior zonal temperature measured by each thermostat; current and prior heating and cooling status; time since last measurement; time since last setpoint change. From this data, data mining based models are developed to predict residential space temperature and humidity, and cooling and heating system status, and cooling and heating system power level. Different data mining approaches can be used to develop the models; however, boosting based regression tree approaches are preferred. At least some of the models developed are unique for each smart thermostat used within any residence, while others are unique to each residence. The input factors for predicting each of these do not include the current values of the parameter being predicted. Some embodiments, as described below, also use building structural data as one or more inputs.

More specifically, in one aspect of this disclosure, the thermostat management system predicts indoor temperature, cooling demand, fan demand, and heating demand from data from the smart thermostat 102. The thermostat management system leverages real-time smart thermostat data from an individual residence (indoor temperature and humidity, cooling and heating setpoint, cooling demand, fan demand, and heating demand) synched with outdoor weather conditions to train a predictive model of the indoor temperature and humidity. Machine learning models suited for modeling time series are used. These include, but are not limited to, Long-Short Term Memory Deep Learning Neural Networks and Encoder-Decoder Long-Short Term Memory Deep Learning Neural Networks. The developed dynamic model can be used to 'forecast' future heating, fan, and/or cooling demand for forecasted weather conditions, and for expected or modified thermostat setpoint temperatures, as well as fan status (on/auto). Heating, cooling, and fan duty cycle reduction associated with modified setpoint temperatures can be estimated.

Figure 5:
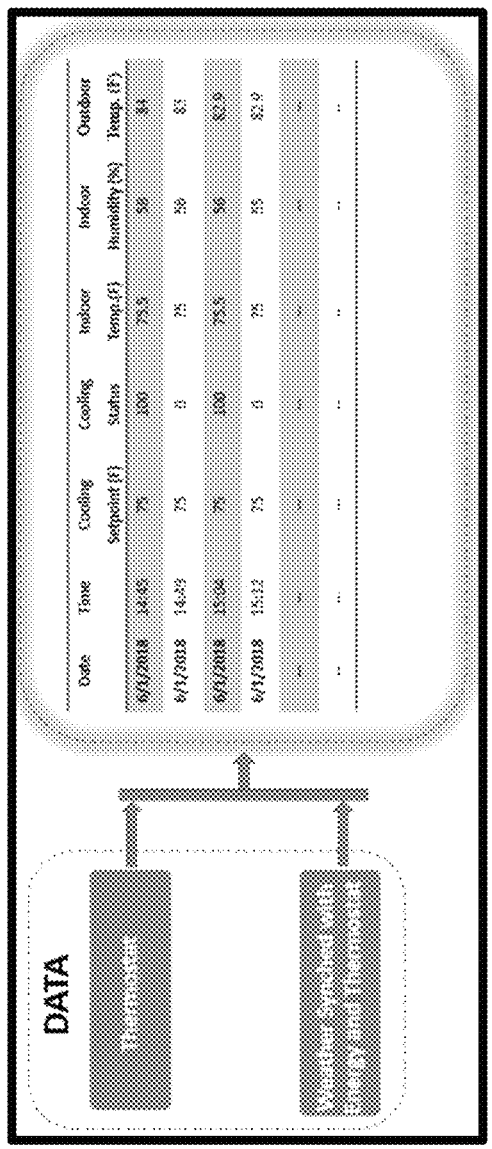
FIG. 5 is a diagram of synching and merging smart thermostat data with outdoor weather data.
Figure 6:
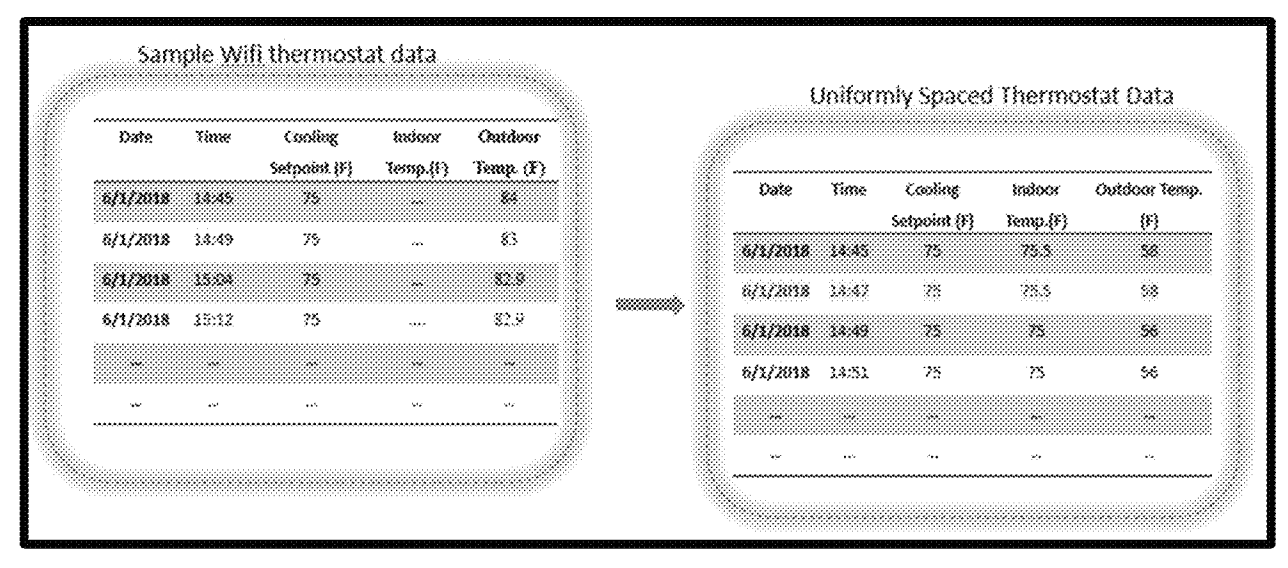
Figure 7:
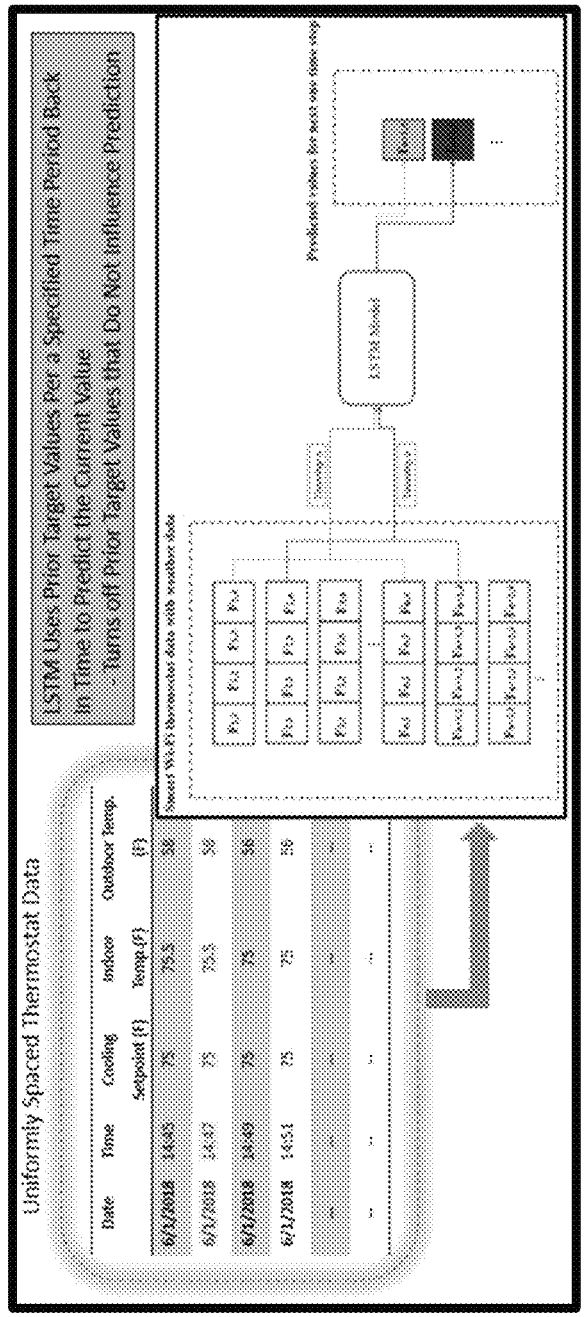
FIG. 7 is a diagram of the use of the uniformly spaced data from FIG. 6 to train a model to predict indoor temperature.
Figure 8:
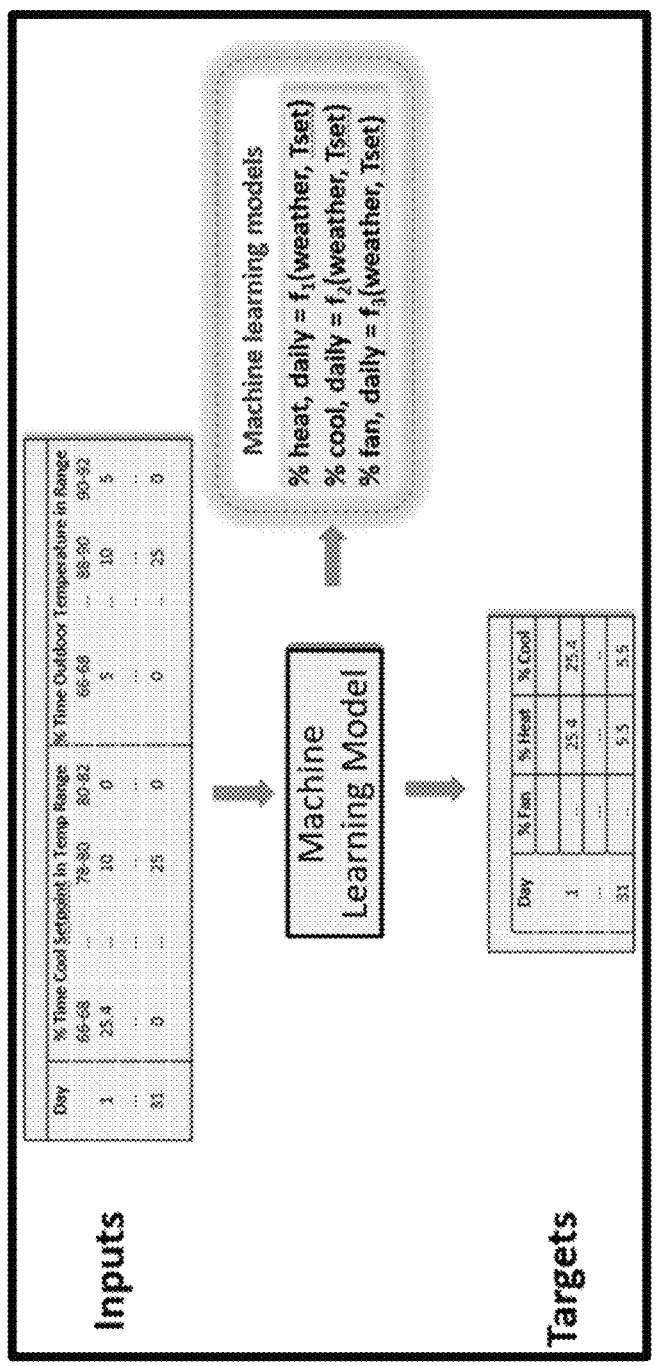
FIG. 8 is a graph of the predictive output of the trained model to predict indoor temperature.

The first steps of the predictive method is to collect data from the smart thermostat 102 and synch and merge the smart thermostat 102 data with outdoor weather data as shown in FIG. 5. Ideally, the collected data is evenly spaced in time (e.g., one set of data for every two minutes). If the data is not evenly spaced, the thermostat management system, creates data to fill the dataset with evenly spaced data by interpolating between actual data points around a gap in the actual data, as shown in FIG. 6. FIG. 7 is a diagram showing the use of the uniformly spaced data from FIG. 6 to train a model to predict indoor temperature. In the example, the uniformly spaced data is used to train long-short term memory deep learning neural network dynamic models to predict the indoor temperature measured by the thermostat. In other embodiments, any other suitable model or machine learning technique may be used. FIG. 8 is a graph of the predictive output of the trained model to predict indoor temperature.

In another aspect of this disclosure, the real-time thermostat data from an individual residence (indoor temperature and humidity, cooling and heating setpoint, cooling demand, fan demand, and heating demand) is synched with outdoor weather conditions to train dynamic models to predict the percentage of times for heating, cooling, and fan demand for discrete periods of time. The combined data is aggregated for discrete time periods, such as a day. In some embodiments, the models employ regression-based machine learning approaches; particularly: distributed Random Forest, Global Boosting, and Deep Learning Neural Networks. Other embodiments use other machine learning techniques. The developed model can be used to 'forecast' future heating, fan, and/or cooling demand for forecasted weather conditions, and for expected or modified thermostat setpoint temperatures, as well as fan status (running/not running) and setting (on/auto). Heating, cooling, and fan duty cycle reduction associated with modified setpoint temperatures can be estimated. This information can be used to improve demand management services to the utility.

Figure 9:
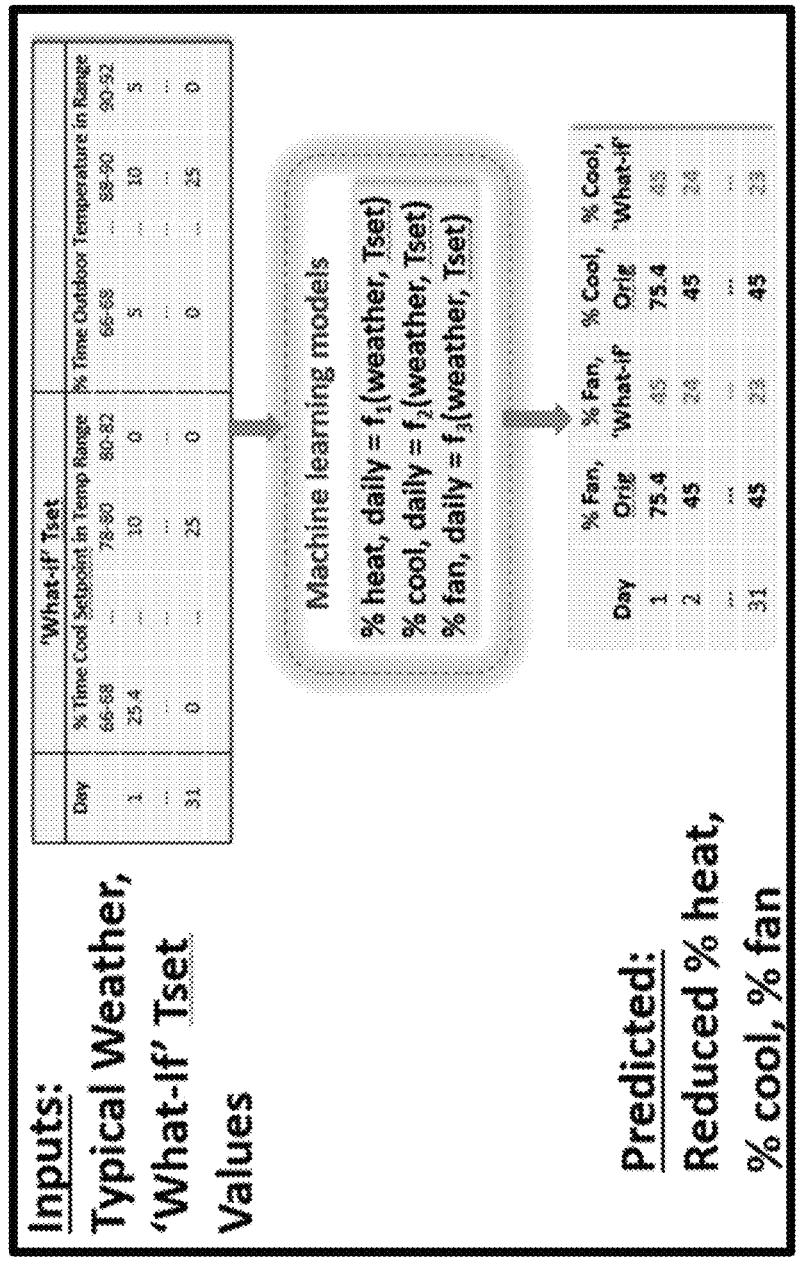
FIG. 9 is a representation of the use of a trained model to predict metered energy consumption savings from thermostat changes.

The data from the smart thermostat 102 is collected and synchronized with outdoor weather data similar to the collection and synchronization described above. In this aspect, the synchronized data is aggregated into daily periods in order to determine the percentage of time each day for heating, cooling, and fan use, the percentage of time each day setpoint temperatures are within different binned temperature ranges, and the percentage of time each day the outdoor temperature is within different binned temperature ranges. As shown in FIG. 8, this aggregated data is then used to train regression-based machine learning models to predict targets of the percentage of time heating and/or cooling, and the percentage of time the fan is on each day. As shown in FIG. 9, the trained model is then used to predict metered energy consumption savings from thermostat changes. Specifically, typical annual weather data and new temperature setpoint schedules are input to the trained models to predict the percentage heating, percentage cooling, and percentage fan use savings from improved thermostat cooling and setpoint temperature schedules. Residents are then given various options for setpoint schedule changes yielding various levels of savings. The savings calculated are determined by using the model to calculate the energy consumption for the current setpoint schedule and the improved setpoint schedule. The difference represents the achievable savings. By implementing the new setpoint schedule, the energy bill will be reflect the savings realized; and the savings will be validated to the estimate.

In another aspect of this disclosure, smart thermostat data, weather, data, and metered energy data is used to develop models to: estimate metered consumption, disaggregate energy consumption into heating, cooling, water heating, and lighting/appliances, and estimate energy savings from setpoint changes. This method leverages real-time thermostat data from an individual residence (cooling and heating setpoint) synched with outdoor weather conditions and metered energy consumption data (electric and gas—as applicable) to train dynamic models to predict metered electric and gas consumption (as applicable). The dynamic models developed employ regression-based machine learning approaches, particularly distributed Random Forest, Global Boosting, and Deep Learning Neural Networks. Other embodiments employ other machine learning techniques.

Figure 11:
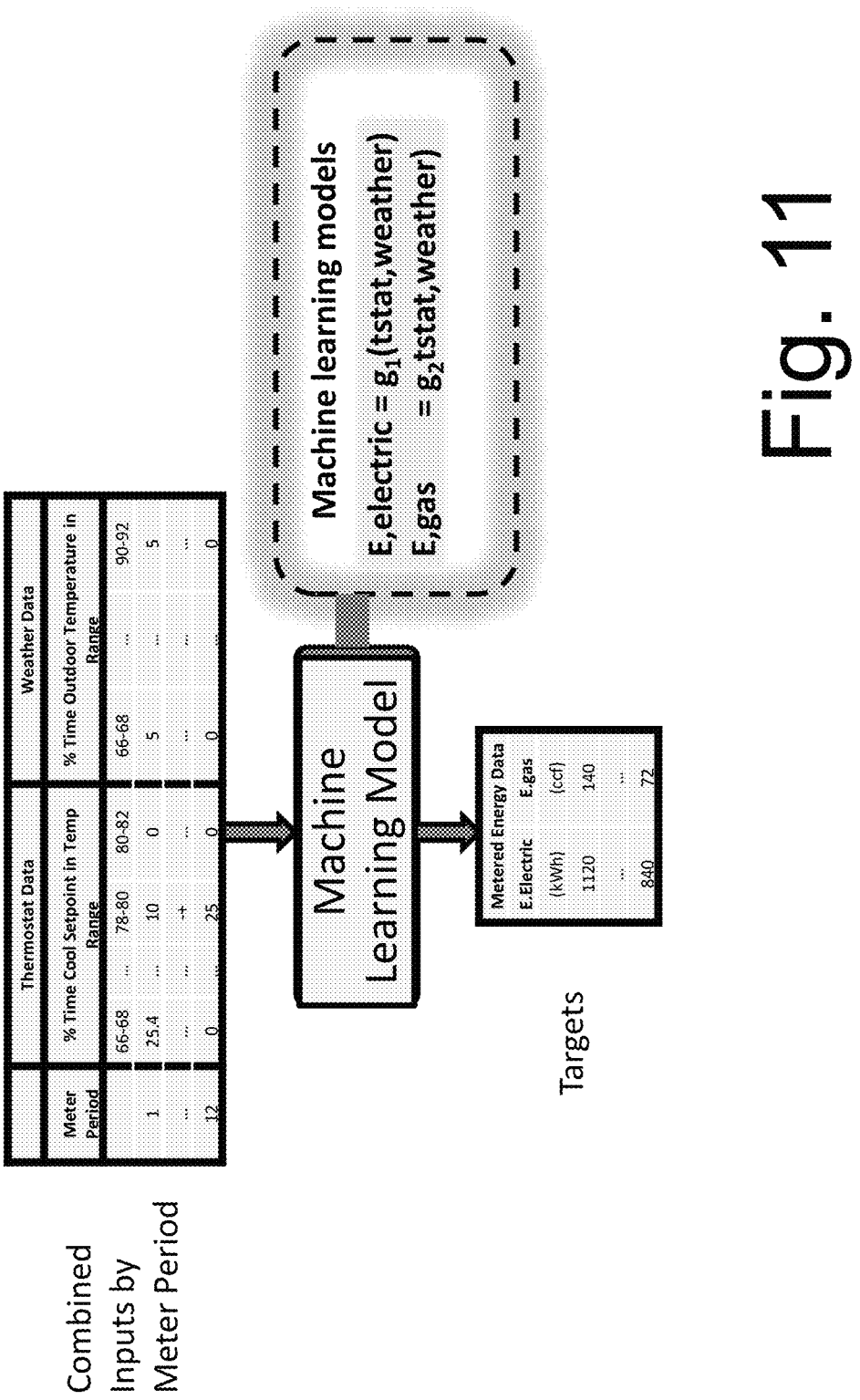
FIG. 11 is a representation of the use of combined data from FIG. 10, aggregated by meter periods, as inputs to train development of a machine learning model to predict the targeted metered energy consumption for each meter period for each included residence.

Data from the smart thermostat 102 is collected by the thermostat management system and synchronized with collected weather data and residential energy consumption data. FIG. 10 is a graphical presentation of an example set of such data. The energy consumption data may be collected from a smart meter (not shown), a remote sensor 302 that monitors energy consumption, or by manual input. The thermostat data and weather data are based upon each meter period. The percentage time during each meter period that the thermostat setpoint temperatures fall within binned ranges, that the heating, cooling, and fans are on, and that the outdoor temperature falls within binned ranges is determined. A machine learning model to predict metered energy consumption is developed using the combined data, aggregated by meter periods, as inputs to train development of a machine learning model to predict the targeted metered energy consumption for each meter period for each residence, as shown in FIG. 11. Separate models are developed for each fuel type.

Figure 12:
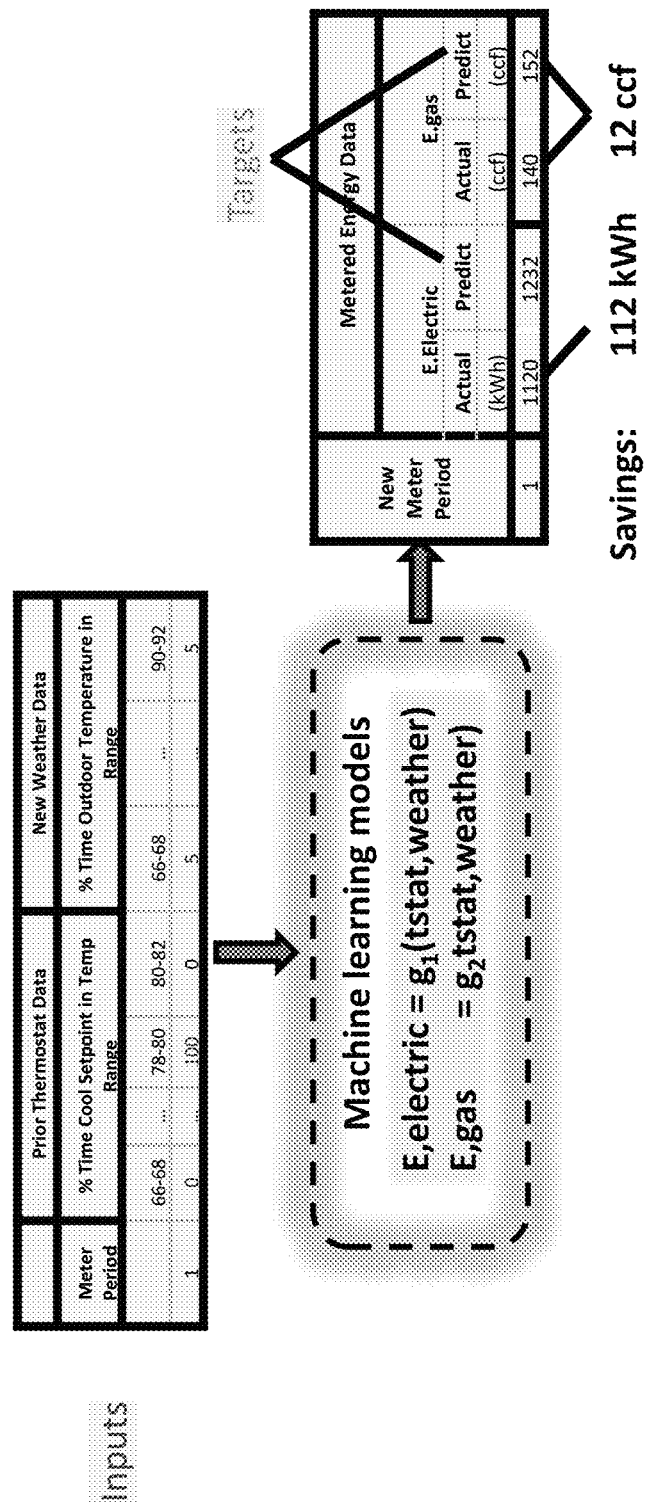
FIG. 12 is a representation of the use of trained models from FIG. 11 to predict energy consumption savings from energy efficient investments and thermostat changes.
Figure 13:
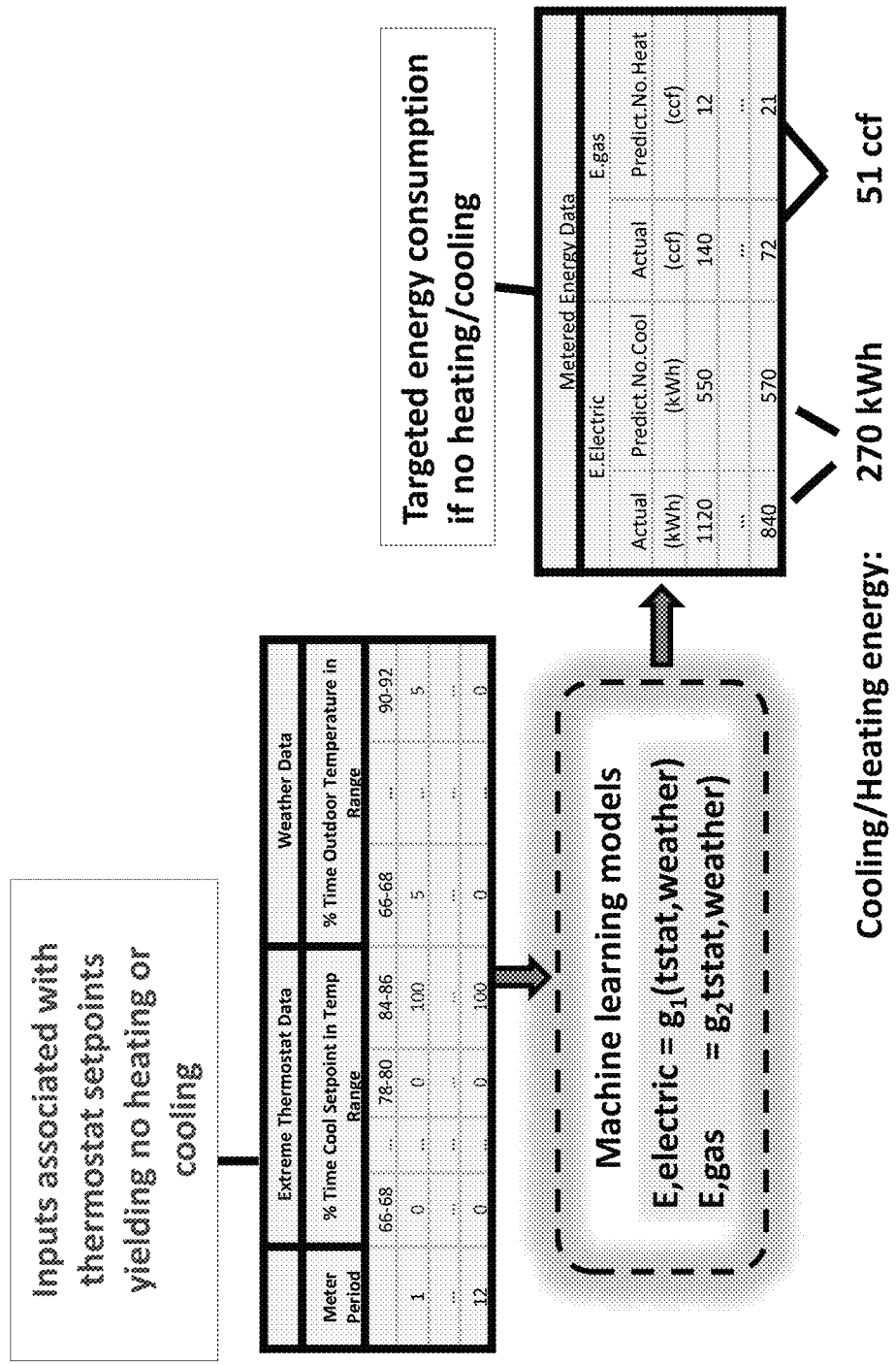
FIG. 13 is a representation of the disaggregation of energy consumption in heating, cooling, and non-weather dependent energy consumption.

The trained models are then used to predict energy consumption savings from energy efficient investments and thermostat changes as shown in FIG. 12. The developed machine learning models are applied to data inputs including prior thermostat setpoint schedule and weather data for a new meter period to predict the targeted energy consumption that would be realized had the residence not experienced any changes. The predicted energy consumption is compared to actual consumption (from the collected meter data). The difference indicates increased or decreased energy use from such things as: changes in setpoint temperatures, insulation addition, heating and cooling system upgrades, HVAC system malfunction, changes in weather-independent energy use (e.g., water heating, lighting, and the like). The thermostat management system the presents potential targets for energy savings or energy increase to the resident, such as through the thermostat management system or on the utility bill.

The thermostat management system also disaggregates energy consumption in heating, cooling, and non-weather dependent energy consumption. This step is shown in FIG.

13. The thermostat management system applies the developed machine learning models to inputs associated with prior weather data and extreme thermostat setpoint values where there would be approximately 0 heating or cooling to predict historical energy consumption. For example, the summer setpoint schedule could be set to 85 degrees. The energy consumption in the absence of heating/cooling would then be computed and compared to the actual energy consumption. The energy consumption predicted in the absence of cooling is non-weather dependent. For electric energy this corresponds to lighting and appliance energy consumption. For gas, if there is a gas water heater, this is associated with water heating energy use. Subtracting the weather-independent energy from the actual metered consumption yields prediction of the weather dependent consumption (cooling and heating). An example graph of such a disaggregated energy result is shown in FIG. 14. If a residence is all-electric, the heating and cooling energy can still be inferred using the same approach. However, the weather-independent energy will generally account for lighting/appliances and water heating for respectively electric and gas fuels.

The thermostat management system is also programmed to automatically audit the energy effectiveness of a detached housing residence using the smart thermostat 102, weather, metered energy consumption, and building geometry data. Occupancy data may also be used to improve the evaluation. Generally, a single model, valid for any stand-alone residence, is developed by combining synched and merged data for all residences from which data is collected into a single dataset. The training data also includes the most important HVAC energy characteristics for a residence, namely the wall insulation thickness, window type, ceiling insulation thickness, water heater fuel type and efficiency, and heating/cooling system efficiency. This data is available within many utility districts which have completed energy audits on many houses. Regression-based machine learning models (Distributed Random Forest, Global Boosting, Deep Learning Neural Network) are developed to accurately predict each individual energy characteristic (wall insulation thickness, window type, heating and cooling system efficiency, and the like) for the training set of residences. Other embodiments utilize other machine learning techniques. The combination of smart thermostat, weather, metered energy consumption, building residential geometry, and potentially occupancy data allows the thermostat management system to predict with accuracy: 1) the metered energy consumption for any house; 2) the individual energy characteristics most important for characterizing the houses; and 3) the most significant HVAC savings and cost potential.

Figure 15:
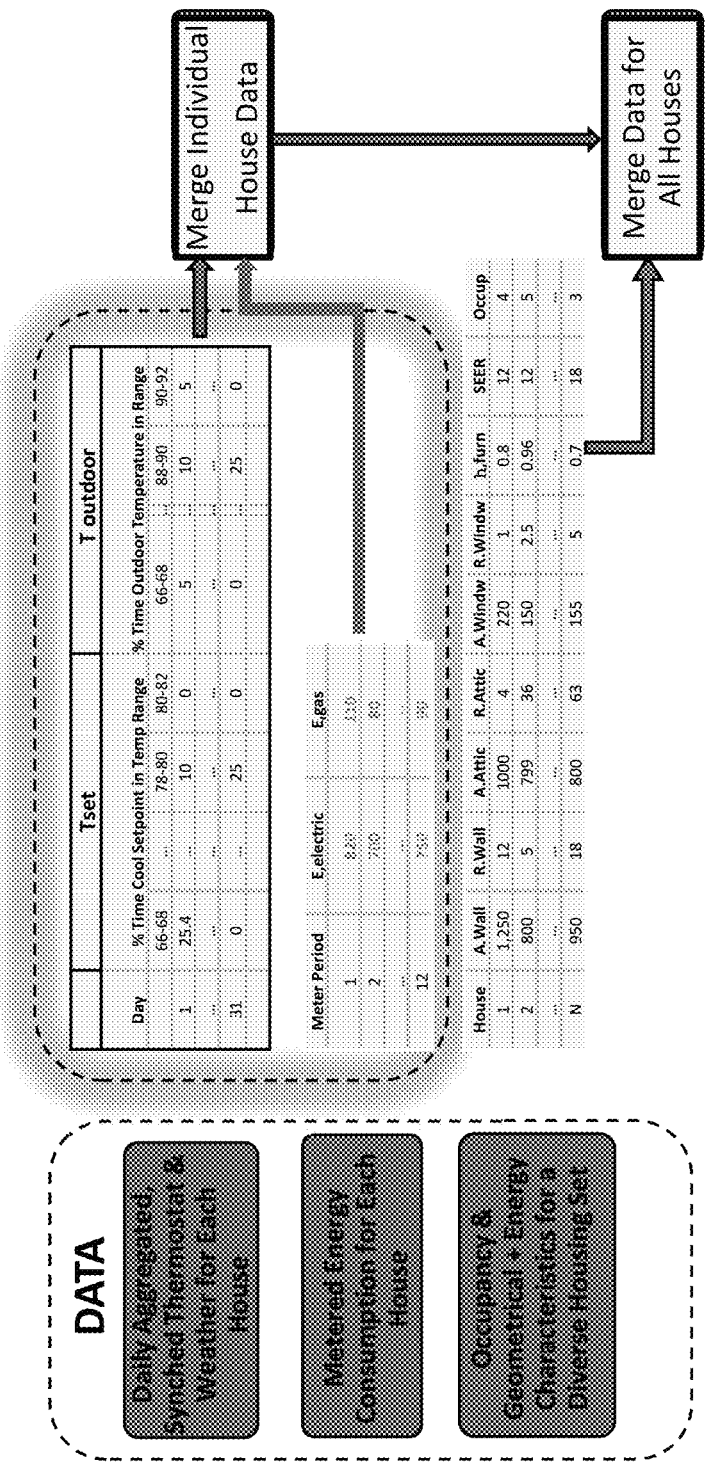
FIG. 15 is a representation of the thermostat management system aggregating synched thermostat, weather, metered energy consumption, occupancy, residential building geometry and energy characteristics data into meter periods for each house, and merging the aggregated data from each house together with the aggregated data for all houses.
Figure 16:
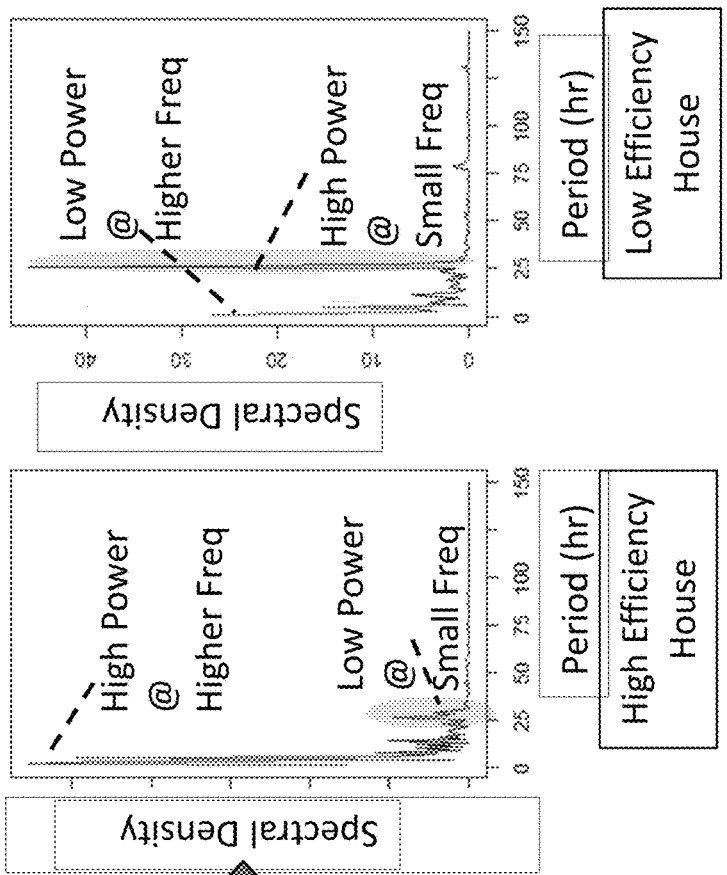
FIG. 16 is a representation of the thermostat management system developing power spectra for measured thermostat temperature.
Figure 17:
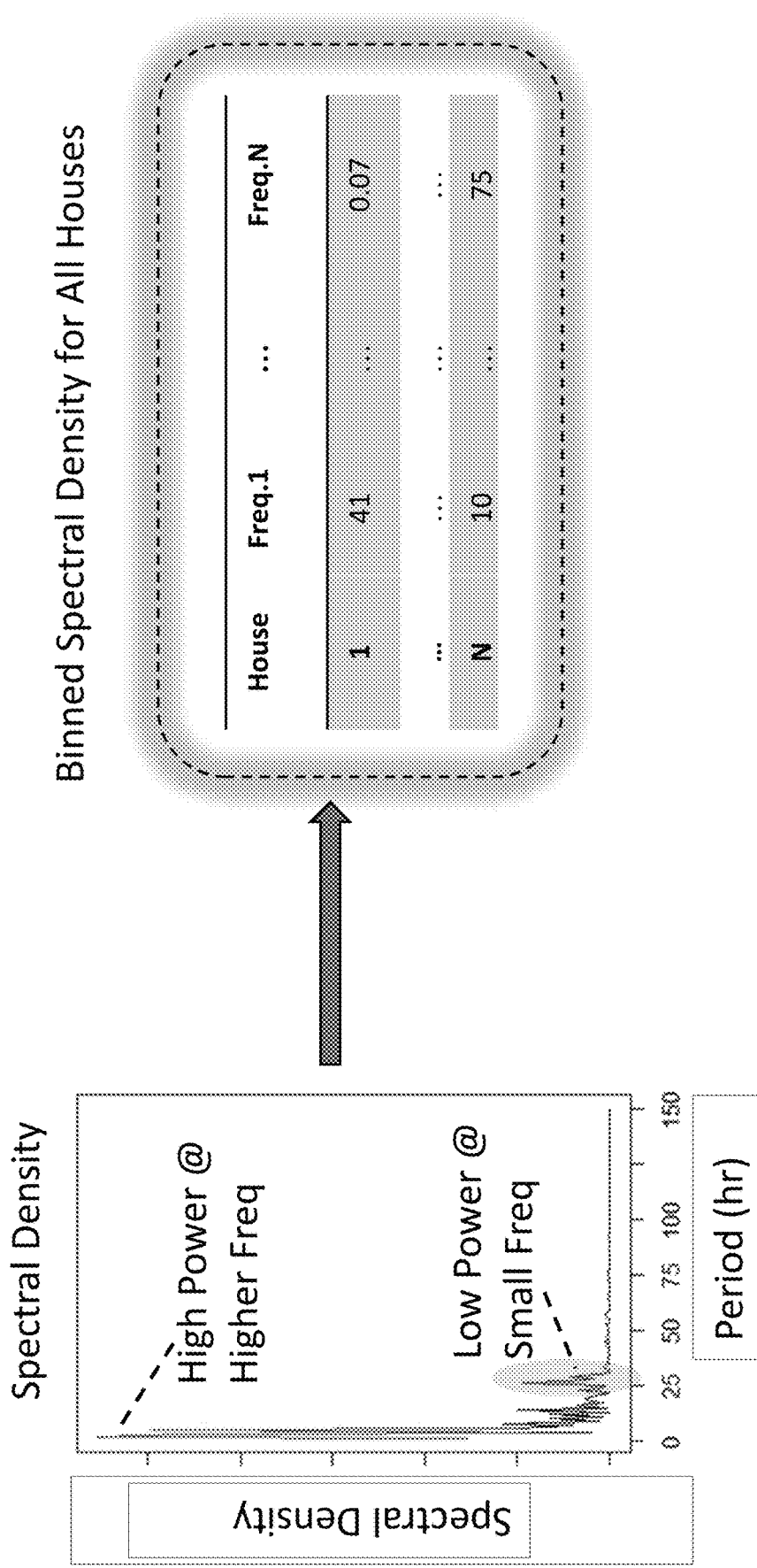
FIG. 17 is a representation of the thermostat management system binning spectral densities by calculating a histogram of the power spectrum developed in FIG. 16 with N frequency bins to calculate the average spectral density in each frequency.

As shown in FIG. 15, the thermostat management system aggregates synched thermostat, weather, metered energy consumption, occupancy, residential building geometry and energy characteristics data into meter periods for each house, and then merges the aggregated data from each house together with the aggregated data for all houses. Turning next to FIG. 16, the thermostat management system then develops power spectra for the measured thermostat temperature. First the thermostat management system creates uniformly spaced thermostat data as described above. Then, the thermostat management system develops power spectrum datasets of the measured smart thermostat temperatures for each residence. Any signal that can be represented as a variable that varies in time has a corresponding frequency spectrum. Here, power spectral density describes how the total power drawn by a house is distributed with frequency. The power spectrum provides information about the house at different frequencies. The different powers provide snapshots of the role of the different residential energy characteristics on different frequencies. For example, a low efficiency house has a much greater power for diurnal time periods (24 hours) than an efficient house. The thermostat management system bins spectral densities by calculating a histogram of the power spectrum developed above with N frequency bins to calculate the average spectral density in each frequency bin (Freq.1, . . . , Freq.N), as shown in FIG. 17.

In this example, all of the house binned spectral data is merged with the merged all house thermostat, energy consumption, energy and geometry characteristics, and occupancy data. In order to train a machine learning model to predict the individual energy characteristics in a residence (e.g., R-values for the walls, windows, and ceiling, heating efficiency, and cooling system efficiency, SEER) this information must be known for a training set of residences. This information may be acquired from energy audits of residences, generally obtained through utility managed residential energy reduction programs. Thereafter, the model can be applied to predict the energy characteristics using as inputs only the merged all house thermostat, energy consumption, geometry characteristics, and occupancy data.

Figure 18:
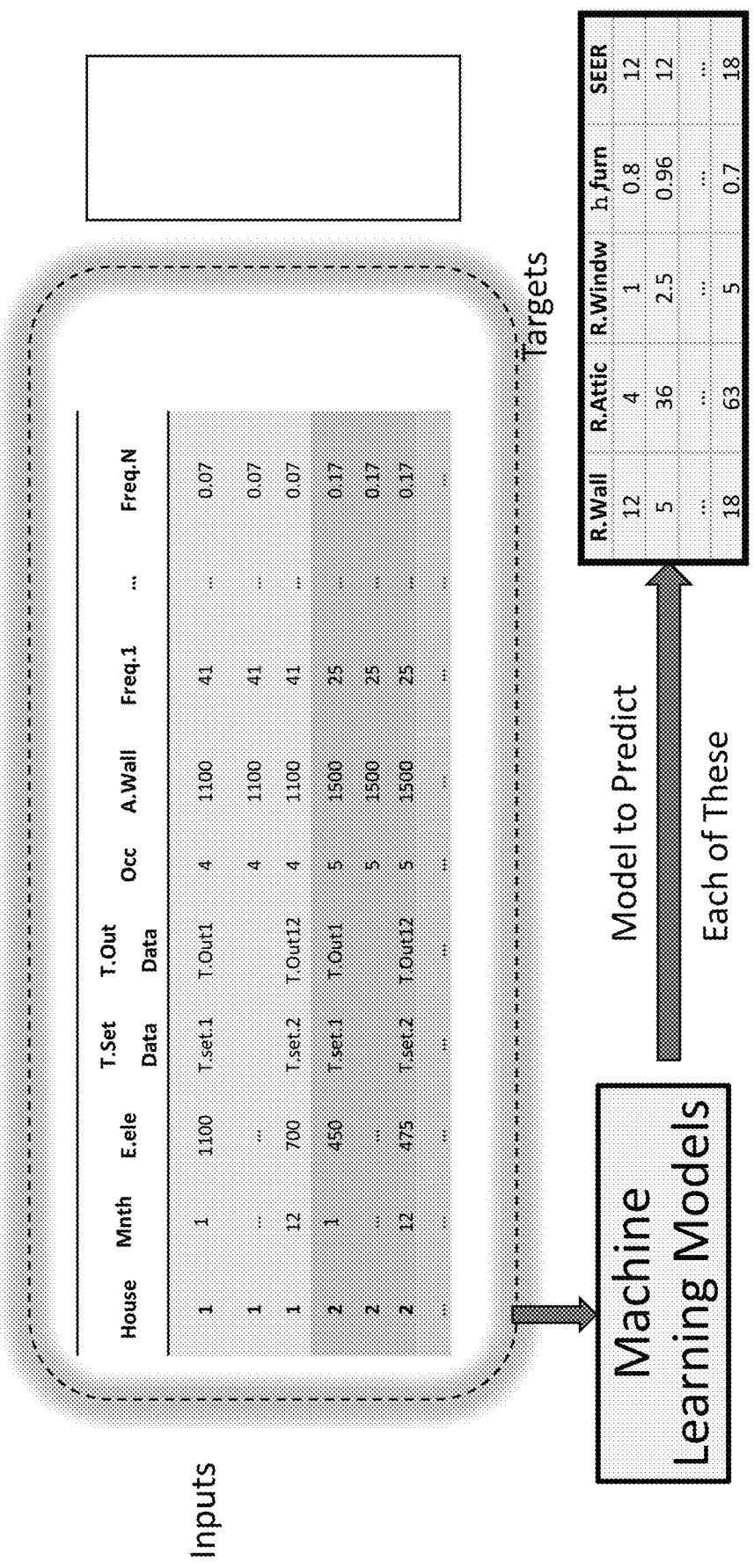
FIG. 18 is a representation of the thermostat management system using combined data to train machine learning models capable of predicting the known energy characteristics of the training set of residences where these characteristics are known.

The combined data from the preceding step is used to train machine learning models capable of predicting the known energy characteristics of the training set of residences where these characteristics are known (FIG. 18). The inputs include month number, historical metered energy consumption aligned with weather data, residential geometrical characteristics, and the binned power spectrum power density data obtained from the thermostat measured temperature. A separate model is required for each energy characteristic. After the models are developed, the thermostat management system uses the trained models to predict energy characteristics in residences with unknown energy characteristics. The system estimates the energy characteristics in new houses where energy characteristics aren't known using developed models for energy characteristics as shown in FIG. 19. The only data needed as inputs to these models is the metered energy consumption, the setpoint, the outside temperature, occupancy, residential geometry characteristics, and the binned power spectrum data for the thermostat interior temperature. The energy characteristics do not have to be known.

Using as inputs the same inputs used in the above step minus the metered energy consumption plus the estimated energy characteristics obtained from the step above for a new residence, the system develops a machine learning model to predict energy consumption from combined data for any residence. Two models are needed if both gas and electric fuel sources are used. The system may further estimate savings from energy efficiency investments in any residence. Using as inputs the data used in the immediately preceding step except with improvements to one or more of the energy characteristics (for example if the wall R-Value of insulation is increased above the determined or known characteristics for the residences), the model to predict consumption developed above is applied to predict energy consumption based upon the improvement. Energy savings from the improvement can be estimated from the difference between the actual consumption and the predicted consumption based upon the improved characteristics (sometimes referred to as a 'What-if' scenario).

The thermostat management system may also develop a utility-scale energy priority—energy reduction process based upon savings predictions. In the previous step the savings from any or all energy systems upgrades (insulation, windows, water heater, heating system, cooling system) can be calculated for individual upgrades or a collection of upgrades for all residences included in a study. In some embodiments, these residences include all residences in a utility district or a portion of a utility district. An example output of such a calculation for electrical savings is shown in FIG. 20. Similar calculations may be made for gas. With these savings results, the priority energy efficiency investments for each individual residence and for all collective residences in the utility district may be determined. A worst-to-first rebate strategy could be developed for each residence and for the collective residences, whereby the most cost effective investments are recommended first and incentivized through rebates, the next most cost effective investments are recommended second, and so on. This represents a potentially radical departure from some known utility rebate programs, and would allow rebates to be based upon statistical savings potential from within an utility district.

Another aspect of this disclosure is a method to forecast real-time demand curtailment for each individual detached residence for HVAC systems disruption. The thermostat management system is programmed to forecast real-time demand curtailment for each individual residence and among a collection of residences within a utility district, by employing the dynamic model developed above for each residence and applying a what-if-scenario in which the heating/cooling/fan is turned off in order to predict the length of time that the heating/cooling/fan can be turned off before a worst case acceptable comfort condition is realized. The curtailed power can be determined from the above described model to predict savings from changes in setpoint temperatures. The developed model can be used to 'forecast' future heating, fan, and/or cooling demand for forecasted weather conditions, and for expected or modified thermostat setpoint temperatures, as well as fan status (running/not running) and setting (on/auto). Heating, cooling, and fan duty cycle reduction associated with modified setpoint temperatures can be estimated. This information can be used to improve demand management services to the utility.

To perform this method, the thermostat management system estimates power associated with cooling, heating, and fan use, using the disaggregation estimates of energy consumption for heating and cooling and the percentage of time each metered energy period that cooling, heating, and fan use are occurring as described in earlier discussed aspects. For example, cooling power is estimated by:

$$P_{cool} = \frac{E_{cool,monthly}}{Hrs_{cool}}, \quad (1)$$

where $E_{cool,monthly}$ is the estimate of cooling energy in a month and $Hrs_{cool}$ is the number of hours in a month that cooling was active. Residents who agree to participate in demand curtailment provide a minimum comfort temperature setpoint that they would find acceptable for during high demand events. For example, during the summer, residents would agree to permit a higher setpoint temperature during a peak demand event. The utility may reward participation with a lower energy cost than non-participating residents.

Figure 21:
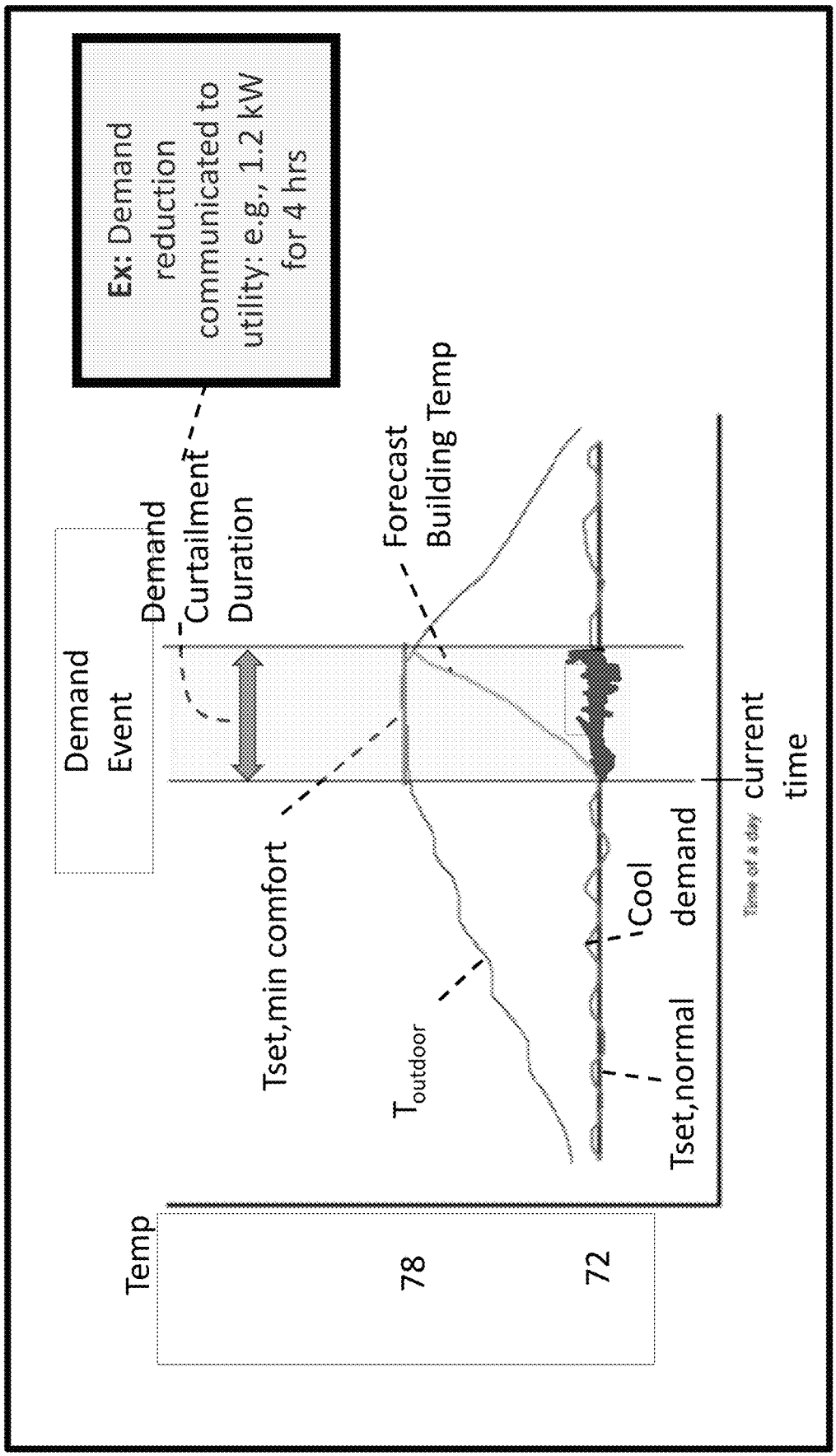
FIG. 21 is a representation of the thermostat management system predicting a demand curtailment duration for each residence and for a collection of residences managed by the thermostat management system.
Figure 22:
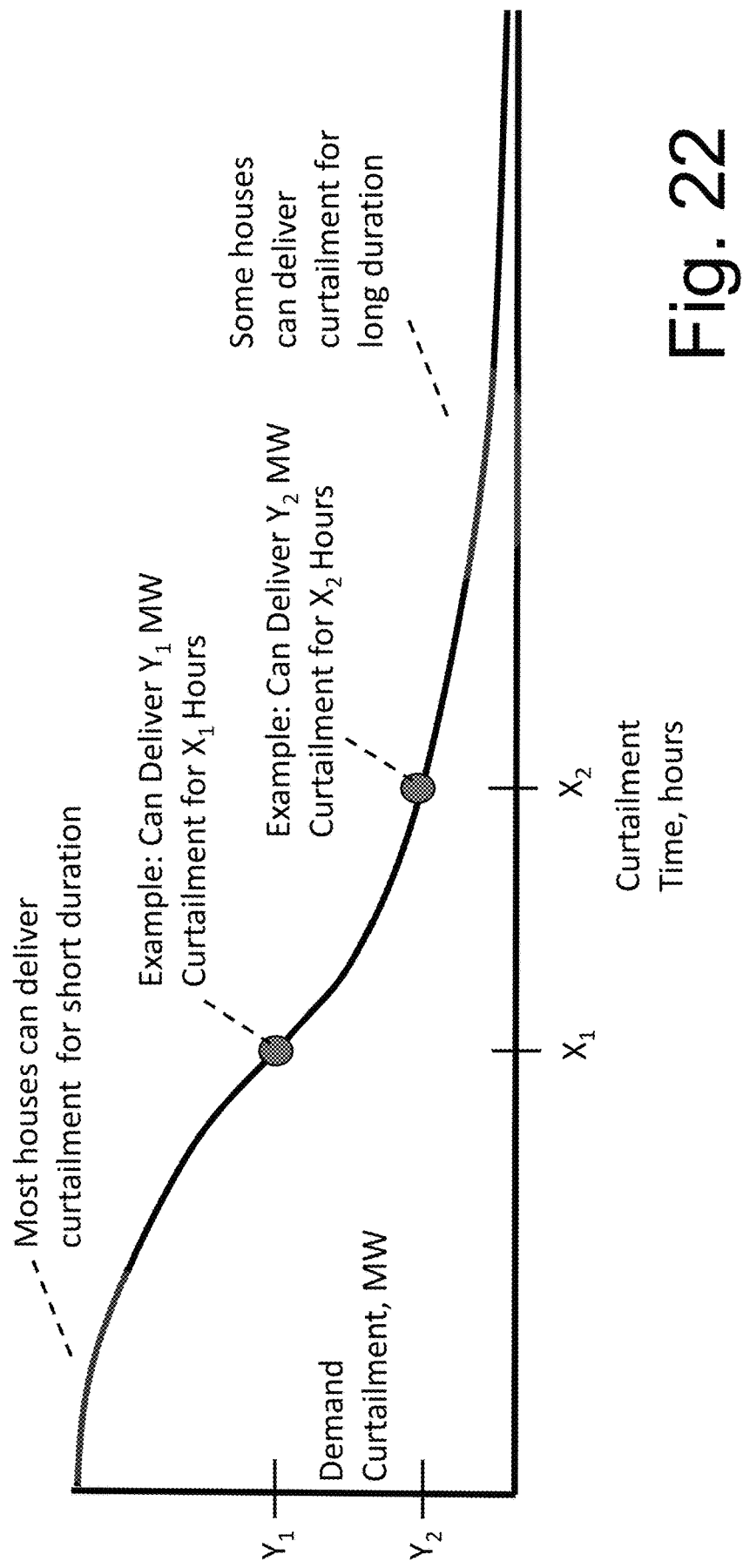
FIG. 22 is an example graph of available demand curtailment as a function of time.

Referring to FIG. 21, the thermostat management system predicts the demand curtailment duration for each residence and for the collection of residences managed by the thermostat management system using, among other things, the resident's selected minimum comfort temperature setpoint. For example, using the models developed above, the thermostat management system determines for a particular building (with its known/calculated characteristics) at a current indoor temperature and under the current outdoor temperature, how long the AC or heat could be shut off before the indoor temperature reaches the resident's selected minimum comfort temperature setpoint. This demand duration (e.g., the amount of load that can be shed for future hours while insuring a minimum comfort condition in each residence) is communicated to the utility, either for each residence individually or for a collection of residences within a utility district, in real time. When curtailment is needed, the utility then knows how much usage may be curtailed and can proceed to demand curtailment of usage as agreed upon. In some embodiments, curtailment is accomplished by a thermostat manager (e.g., the resident, a person in charge controlling thermostat settings for one or more properties, or the like) manually adjusts the setpoints in response to the demand. In other embodiments, the thermostat management system or the smart thermostat is programmed to respond automatically as agreed upon to a demand for curtailment from the utility provider. Once the temperature in a building reaches the minimum comfort setpoint, if the utility grid is still calling for curtailment, the smart thermostat will operate the building's HVAC system to maintain the house at this minimum comfort condition until the peak demand event ended. Once the curtailment ends (whether or not the minimum comfort temperature setpoint was reached), the smart thermostat returns to operation of the HVAC system according to its normal setpoint programming. By receiving such data from the thermostat management system, the potential demand curtailment of each house can be known at all times by the utility and the potential curtailment from all residences within a utility grid district at all times (FIG. 22). The smart thermostat data doesn't include demand in units of kilowatts. In a region where interval metering exists, the demand that can be shed from heat pumps and air conditioning systems is known. But, in regions where interval meters are not present, the thermostat can only provide information about the status of these systems. In this case, the demand is knowable when the thermostat manager also serves as a utility interface to a residence, whereby they would have access to the monthly meter consumption data. Combining the thermostat and meter consumption datasets enables estimation of the real time demand from the electric heating and cooling systems, simply by correlating monthly demand to monthly heating or cooling system duty cycles.

In still another aspect of this disclosure, the thermostat management system provides continuous conditioning and fault detection of HVAC systems in any type of building using only the smart thermostat data. This performance monitoring of the HVAC system includes monitoring the health of the equipment of the system, monitoring for changes in behavior of occupants of the building that affect the HVAC system, and fault monitoring, detection, and diagnostics.

The thermostat management system uses the developed percentage heating, percentage cooling, and percentage fan use models developed above to predict these targets daily for the actual daily weather conditions and applied thermostat settings. Periodically (such as at the end of every day, once an hour, once a week, or the like) the percentage heating, percentage cooling, and percentage fan use models developed in above are then used to predict the percentage heating, percentage cooling, and percentage fan use for the weather conditions and setpoint temperatures seen for that interval. These calculations are assumed to represent healthy operation of the system. The predicted percentage heating, percentage cooling, and percentage fan use based upon 'healthy' condition model is compared to the actual percentage heating, percentage cooling, and percentage fan use from the smart thermostat data for the same interval. The system detects increases in any of these relative to the healthy model predictions. If the difference between the predicted and actual duty cycles exceeds a threshold value, the HVAC system is determined to potentially need attention, such as servicing. The threshold value may be a predetermined or a calculated threshold value. When the threshold value is exceeded, the system outputs a notification, such as to the resident, a manager of the building, the resident's HVAC service provider, or the like.

Example embodiments of systems and methods for learning and predicting from smart thermostat data, and controlling a thermostat based on such learning and predicting. The system is not limited to the specific embodiments described herein, but rather, components of the system may be used independently and separately from other components described herein. For example, the server and processor described herein may also be used in combination with other systems and methods, and are not limited to practice with only the system as described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A method of HVAC system performance monitoring using a computing device connected to at least one thermostat of an HVAC system in a building including a fan, the method comprising:
    receiving thermostat data from the thermostat, the thermostat data including temperature setpoint data, measured building temperature data, and HVAC operation data for an initial time period, the HVAC operation data including usage data for the HVAC system fan;
    receiving weather data from a weather service for the initial time period;
    synchronizing the thermostat data with the weather data with respect to time;
    determining, by interpolation, intermediate data between any data that is non-uniformly spaced with respect to time in the synchronized thermostat and weather data;
    inserting the intermediate data into the synchronized thermostat and weather data to generate synchronized thermostat and weather data that is uniformly spaced;
    training at least one machine learning model using the synchronized thermostat and weather data;
    monitoring performance of the HVAC system over time using the trained machine learning model by repeatedly:
        receiving weather data from the weather service for a future time period after the initial time period;
        receiving additional thermostat data for the future time period from the thermostat, the additional thermostat data including temperature setpoint data, measured building temperature data, and HVAC operation data for the future time period;
        determining, based on the received additional thermostat data, an actual amount of heating or cooling and an actual amount of fan usage for the future time period;
        determining, using the trained machine learning model and based on the received weather data for the future time period, an expected amount of heating or cooling and an expected amount of fan usage for the future time period with the HVAC system set at the determined temperature setpoint;
        comparing the actual amount of heating or cooling to the expected amount of heating or cooling;
        comparing the actual amount of fan usage to the expected amount fan usage; and
        determining that the performance of the HVAC system has decreased when the actual amount of heating or cooling differs from the expected amount of heating or cooling by more than a first threshold amount or the actual amount of fan usage differs from the expected amount of fan usage by more than a second threshold amount; and
    outputting an alert when the monitored performance of the HVAC system is determined to have decreased.

2. The method of claim 1, wherein receiving weather data from the weather service for the future time period, receiving additional thermostat data from the thermostat during the future time period, using the trained machine learning model to determine the predicted HVAC operation during the future time period based on the weather data for the future time period, and comparing the additional thermostat data for the future time period to the predicted HVAC operation for the future time period are performed once per day.

3. The method of claim 1, wherein training at least one machine learning model using the synchronized thermostat and weather data comprises training a regression based model using the synchronized thermostat and weather data.

4. The method of claim 1, wherein training at least one machine learning model using the synchronized thermostat and weather data comprises training a long short-term memory deep learning neural network dynamic model using the synchronized thermostat and weather data.

5. The method of claim 1, wherein outputting an alert when the monitored performance of the HVAC system is determined to have decreased comprises outputting an alert to a service provider associated with the building.

6. The method of claim 1, further comprising servicing the HVAC system in response to the output alert.

7. The method of claim 1, wherein training at least one machine learning model using the synchronized thermostat and weather data comprises training an encoder-decoder long short-term memory deep learning neural network dynamic model using the synchronized thermostat and weather data.

8. The method of claim 1, wherein training at least one machine learning model using the synchronized thermostat and weather data comprises training a distributed random forest model using the synchronized thermostat and weather data.

9. The method of claim 1, wherein training at least one machine learning model using the synchronized thermostat and weather data comprises training a global boosting model using the synchronized thermostat and weather data.

10. A performance monitoring system comprising:
a communication interface, the communication interface operable to communicatively couple the performance monitoring system to at least one thermostat of an HVAC system in a building including a fan,
a memory; and
a processor coupled to the communication interface and the memory, the memory storing instructions that when executed by the processor cause the processor to:
receive thermostat data from the thermostat through the communication interface, the thermostat data including temperature setpoint data, measured building temperature data, and HVAC operation data for an initial time period;
receive weather data from a weather service for the initial time period;
synchronize the thermostat data with the weather data with respect to time;
determine, by interpolation, intermediate data between any data that is non-uniformly spaced with respect to time in the synchronized thermostat and weather data;
insert the intermediate data into the synchronized thermostat and weather data to generate synchronized thermostat and weather data that is uniformly spaced;
train at least one machine learning model using the synchronized thermostat and weather data;
monitor performance of the HVAC system over time using the trained machine learning model by repeatedly:
receiving weather data from the weather service for a future time period after the initial time period;
receiving additional thermostat data for the future time period from the thermostat, the additional thermostat data including temperature setpoint data, measured building temperature data, and HVAC operation data for the future time period;
determining, based on the received additional thermostat data, an actual amount of heating or cooling and an actual amount of fan usage for the future time period;
determining, using the trained machine learning model and based on the received weather data for the future time period, an expected amount of heating or cooling and an expected amount of fan usage for the future time period with the HVAC system set at the determined temperature setpoint;
comparing the actual amount of heating or cooling to the expected amount of heating or cooling;
comparing the actual amount of fan usage to the expected amount of fan usage; and
determining that the performance of the HVAC system has decreased when the actual amount of heating or cooling differs from the expected amount of heating or cooling by more than a first threshold amount or the actual amount of fan usage differs from the expected amount of fan usage by more than a second threshold amount; and
output an alert when the monitored performance of the HVAC system is determined to have decreased.

11. The performance monitoring system of claim 10, wherein the instructions cause the processor to receive weather data from the weather service for the future time period, receive additional thermostat data from the thermostat during the future time period, use the trained machine learning model to determine the predicted HVAC operation during the future time period based on the weather data for the future time period, and compare the additional thermostat data for the future time period to the predicted HVAC operation for the future time period once per day.

12. The performance monitoring system of claim 10, wherein the instructions cause the processor to train at least one machine learning model using the synchronized thermostat and weather data by training a regression based model using the synchronized thermostat and weather data.

13. The performance monitoring system of claim 10, wherein the instructions cause the processor to train at least one machine learning model using the synchronized thermostat and weather data by training a long short-term memory deep learning neural network dynamic model using the synchronized thermostat and weather data.

14. The performance monitoring system of claim 10, wherein the instructions cause the processor to output the alert when the monitored performance of the HVAC system is determined to have decreased by outputting an alert to a service provider associated with the building.

15. The performance monitoring system of claim 10, wherein the instructions cause the processor to train at least one machine learning model using the synchronized thermostat and weather data by training an encoder-decoder long short-term memory deep learning neural network dynamic model using the synchronized thermostat and weather data.

16. The performance monitoring system of claim 10, wherein the instructions cause the processor to train at least one machine learning model using the synchronized thermostat and weather data by training a distributed random forest model using the synchronized thermostat and weather data.

17. The performance monitoring system of claim 10, wherein the instructions cause the processor to train at least one machine learning model using the synchronized thermostat and weather data by training a global boosting model using the synchronized thermostat and weather data.

* * * * *